US006580972B1

(12) United States Patent
Strohbeck

(10) Patent No.: US 6,580,972 B1
(45) Date of Patent: Jun. 17, 2003

(54) DEVICE AND METHOD FOR REPRODUCING INFORMATION IN A MOTOR VEHICLE

(75) Inventor: Walter Strohbeck, Narre Wawen (AU)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/936,846

(22) PCT Filed: Mar. 20, 2000

(86) PCT No.: PCT/DE00/00832

§ 371 (c)(1), (2), (4) Date: Jan. 7, 2002

(87) PCT Pub. No.: WO00/57009

PCT Pub. Date: Sep. 28, 2000

(30) Foreign Application Priority Data

Mar. 22, 1999 (DE) ........................................ 199 12 748

(51) Int. Cl.$^{7}$ ............................ G06F 7/00; B60R 25/00

(52) U.S. Cl. ............................... 701/1; 701/32; 701/36; 307/10.3; 307/10.5

(58) Field of Search ............................ 701/1, 2, 29, 33, 701/36, 32; 307/9.1, 10.1, 10.2, 10.3, 10.5, 10.6

(56) References Cited

U.S. PATENT DOCUMENTS

| | | | |
|---|---|---|---|
| 5,513,107 A | 4/1996 | Gormley | 701/48 |
| 5,552,641 A | 9/1996 | Schneider et al. | 307/10.5 |

FOREIGN PATENT DOCUMENTS

| | | |
|---|---|---|
| DE | 196 480 42 | 5/1998 |
| DE | 197 28 226 | 1/1999 |
| EP | 0 592 166 | 4/1994 |
| EP | 0 762 339 | 3/1997 |
| EP | 0 924 123 | 6/1999 |
| FR | 2 752 004 | 2/1998 |

*Primary Examiner*—William A Cuchlinski, Jr.
*Assistant Examiner*—Edward Pipala
(74) *Attorney, Agent, or Firm*—Kenyon & Kenyon

(57) ABSTRACT

A device and a method for reproducing information in a motor vehicle include, as part of a keyless access system and/or drive authorization system, a portable transponder for sending a code via a transceiver to a control device arranged in the motor vehicle. Access authorization and/or drive authorization are granted if the control device receives a valid code. A display is arranged in the vehicle. The display displays specific data based on an output signal from the control device.

12 Claims, 2 Drawing Sheets

DEVICE AND METHOD FOR REPRODUCING INFORMATION IN A MOTOR VEHICLE

FIELD OF THE INVENTION

The present invention relates to a device and a method for reproducing information in a motor vehicle.

BACKGROUND INFORMATION

In German Published Patent Application No. 196 480 42 is discussed a motor vehicle having a key for to identifying an authorized user. Data such as the customer's address, the vehicle ID number, or the odometer reading are stored in the key. At a workshop the key is placed in a read device, which is connected to a computer and on whose screen a dialog is carried out in order to read out the key data. However, the data can only be displayed if a password is entered manually.

This device may only be suitable for reading out pertinent data if it is used in conjunction with an external device.

SUMMARY OF THE INVENTION

An object of an exemplary embodiment and/or exemplary method of the present invention is to provide a display device having additional functions, for normal use of the vehicle.

An exemplary device according to the present invention for reproducing information in a motor vehicle includes one (or a plurality) of portable transponders as part of a keyless access system and/or drive authorization system, which sends a code to a control device inside the vehicle. Access authorization and/or drive authorization is granted if the control device receives a valid code. It includes a display, which is arranged inside the vehicle. The display displays specific data based on an output signal from the control device.

The display can only be activated if a valid code transmitted by the transponder is received. The pertinent data are only made available to a user who has thus demonstrated that he is authorized. Other persons who are not in possession of a valid transponder cannot gain access to these data. Based on the code received, the display can be updated automatically, further operating signals from the user not being necessary to accomplish this. Therefore, the code signal from a transponder is suitable for this initiation procedure for the display, as the code signal transmission procedure is already carried out before initiation of the start procedure for the vehicle. Thus, the user can be supplied with pertinent information about the vehicle's operating condition in advance before he operates the ignition. The code signal of a transponder is triggered automatically upon operation of the outside door handle, the ignition/start switch, and the remote control button of the transponder (if present).

According to another exemplary embodiment, the data is also displayed if a further operating element, a door contact, has been operated. The combination of the transponder query and an output signal from an operating element provides security against unauthorized access to the data, and the display is not activated until the instant when operation of an operating element indicates that the user is inside the vehicle.

According to another exemplary embodiment, data which depend directly on the code received by the control device is transmitted to the display. To accomplish this, the control device sends out a search signal which addresses all transponders assigned to the vehicle. The transponders that are located within the control device's transmission range send back a corresponding answer signal. Based on the incoming signals, the control device can determine which transponders are present. This information is forwarded to the display. Thus, the user is informed of which transponders are located inside the vehicle. In particular, this information reminds the driver before he leaves the vehicle that he should take the transponders that are in the vehicle with him so as to reduce the risk of unauthorized starting of the vehicle.

The display duration may be limited to a predefined time. This should at least better ensure that no operation intervention to support the functionality of the exemplary method should be necessary. According to another exemplary embodiment, the current display duration is extended by a further full basic duration if a further trigger event occurs before the predefined display time has elapsed. In addition to straightforward timer control, the display duration can also be coupled to the occurrence of a further event. This event may be the starting and/or stopping of the engine or the locking of the vehicle.

The exemplary method according to the present invention for reproducing information in a motor vehicle may use a portable transponder as part of a keyless access system and/or drive authorization system which transmits a code via a transceiver to a control device arranged inside the vehicle, access authorization and/or drive authorization being granted if the control device receives a valid code. A display is arranged inside the vehicle, the display displaying specific data based on an output signal from the control device. The exemplary method involves the following steps:

Transceiver sends out a search signal which causes the transponder to send back a code;

The control device evaluates the code received via the transceiver; and

The display is activated.

The data exchange carried out in connection with the authorization query provides information as to which transponders are located within the transceiver's coverage range. This information is forwarded to the display in the next step, and is available to the user immediately. According to another exemplary embodiment, the display is also triggered even if no code or an unauthorized code is received during a time period that begins with the sending out of the search signal. The user can be made aware of this critical situation immediately, as the corresponding query procedure for transponder recognition has already been carried out.

DETAILED DESCRIPTION

Figure 1:
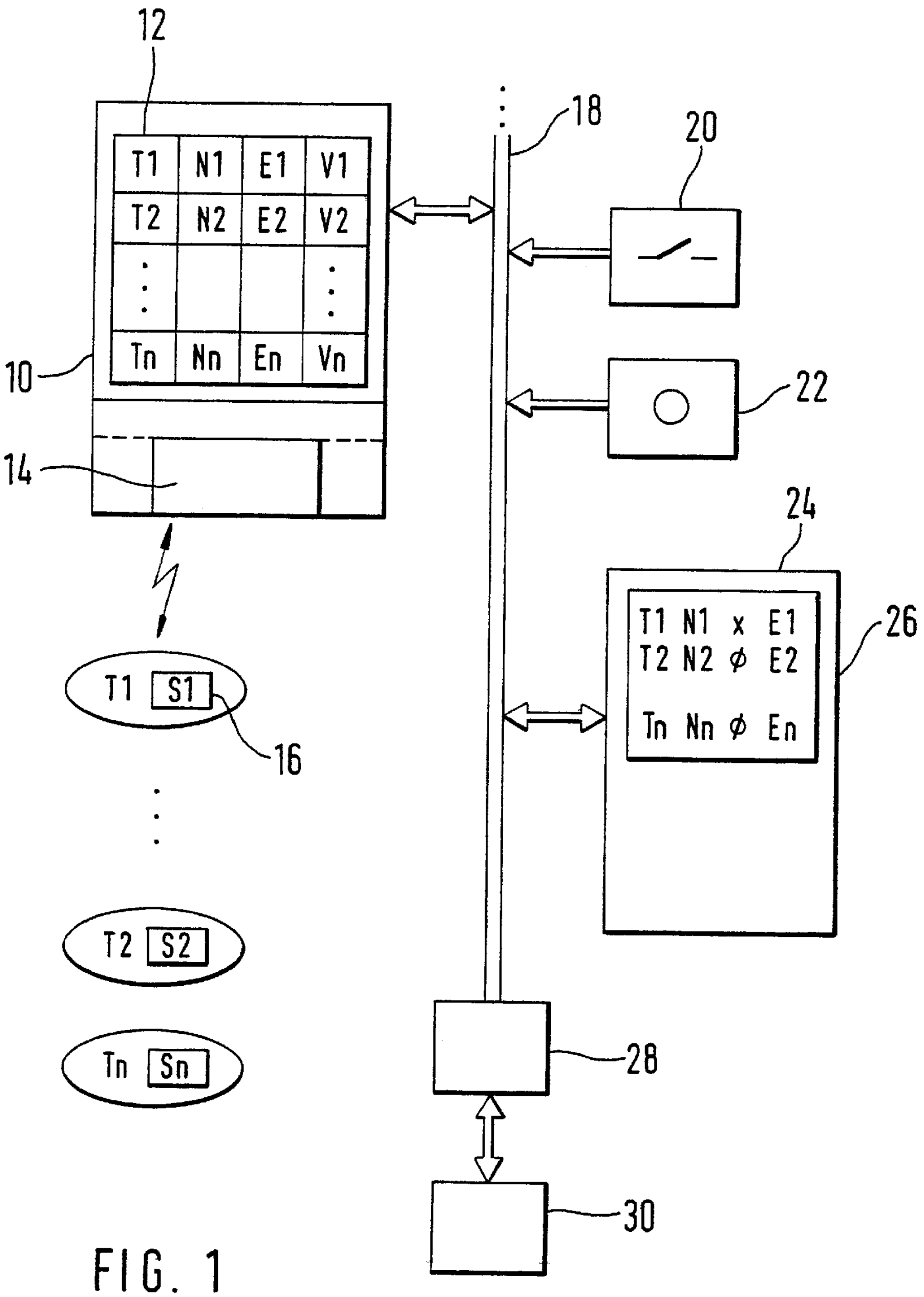
FIG. 1 shows a block diagram.

Memory 12 and transceiver 14 are arranged in control device 10. Transceiver 14 exchanges data with first transponder T1 and if necessary with second transponder T2 and nth transponder Tn. For each of these transponders T1, T2, Tn, an accompanying name N1, N2, Nn of a transponder user, settings E1, E2, En, and confidential data V1, V2, Vn are stored in memory 12. In each of transponders T1, T2, Tn, special data S1, S2, Sn are stored in a memory. Control device 10 communicates via bus system 18 with display unit 24, which includes display 26. A signal from door switch 20 and a signal from operating element 22 are conveyed to bus system 18. Diagnosis interface 28 via which, in conjunction with input/output unit 30, data can be read in or out, is provided on bus system 18. In normal operating mode, names N1, N2, Nn, binary information (x, 0) and settings E1, E2, En that are assigned to transponders T1, T2, Tn are displayed to the user via a display.

In a special operating mode, name N1, N2, Nn, the binary information, settings E1, E2, En, confidential data V1, V2, Vn and special data S1, S2, Sn that are assigned to the transponders T1, T2, Tn in question appear on the display; as an alternative, just parts of this information are displayed.

Figure 3:
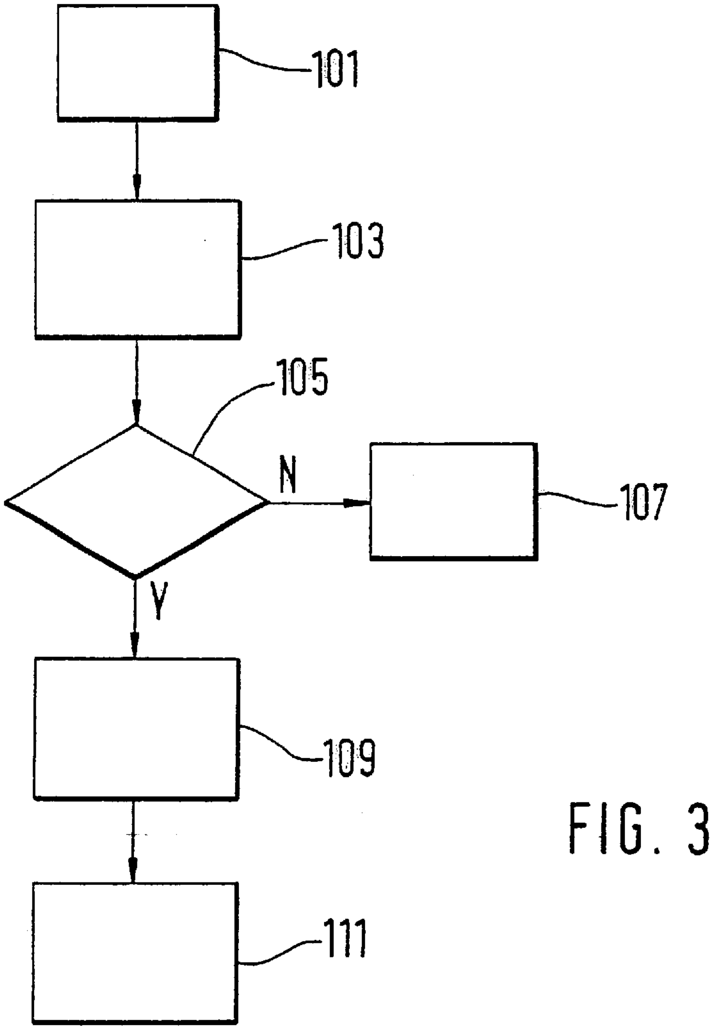
FIG. 3 shows a flow chart relating to the exemplary embodiment and/or exemplary method.

The flow chart shown in FIG. 3 is now used for describing the exemplary method and/or how the exemplary device according to the present invention functions. A user who is in possession of first transponder T1 approaches the vehicle. In order to achieve access authorization, he operates the door handle (Step 101). The corresponding signal exchange is evaluated by control device 10. Transceiver 14 of control device 10 thereupon sends out a search signal. First transponder T1, which is within the range of transceiver 14, sends back an answer signal/code to control device 10. Based on the answer signal sent back, control device 10 determines which transponders T1, T2, Tn are located within the range of transceiver 14.

The evaluation as to which transponder T1, T2, Tn is present may be performed using, for example, a characteristic transmission time delay for the answer signal which distinguishes transponders T1, T2, Tn from each other. Each transponder T1, T2, Tn is assigned a corresponding time slot. If an answer signal is received within this characteristic time slot, control device 10 determines that transponder T1, T2, Tn that answers within this time slot is within range. Based on this evaluation procedure, the binary information is generated as to whether the transponder in question T1, T2, Tn is present (x) or not (0).

Triggering of the authorization query in Step 103 can also be carried out or performed in conjunction with opening or closing of the doors, or upon operation of an operating element in conjunction with a start or stop procedure of the vehicle. In this context, these transceivers 14 which cover the vehicle interior are triggered with a view to sending out a search signal. The incoming signals from transponders T1, T2, Tn may be used to determine which transponders T1, T2, Tn are located inside the vehicle. In Step 111, this information is made available to the display.

Provided a valid answer signal is received at transceiver 14, authorization query 103 is carried out next. To accomplish this, a signal is sent to first transponder T1, which has been recognized as being present, and is processed by first transponder T1. First transponder T1 sends the processed signal back as a code. At the same time, the identical procedure for determining the expected code is carried out in control device 10.

If the incoming code from first transponder T1 matches the expected code, the authorization procedure is deemed to have been carried out successfully (Step 105). If they do not match, the authorization procedure is terminated so that there is no result (Step 107). Based on the authorization query (Step 103), either authorization for access to the vehicle, or a drive authorization, which enables the control devices required for operation and thus allows the driver to start the engine, is granted. If the authorization query has been carried out successfully, control device 10 transmits a command signal and the data to be displayed, such as transponder T1, T2, Tn, name N1, N2, Nn, transponder-dependent binary information, and settings E1, E2, En, to display unit 24 via bus system 18.

This data is merely an example. Any desired information may be displayed. Thus for each transponder T1, T2, Tn the name N1, N2, Nn of the transponder user in question is stored in memory 12 of control device 10. This is shown on the screen of display 26 in alphanumeric form. Settings E1, E2, En may constitute information as to whether the transponder T1, T2, Tn is blocked for an authorization query. Similarly, transponder-dependent user settings E1, E2, En could constitute a seat adjustment setting, a mirror adjustment setting or the like. Display unit 24 prepares the data made available by control device 10 and triggers display 26. This data is visible on display 26 for a predefined length of time.

According to another exemplary embodiment, the data is only displayed if the authorization query per Step 103 has successfully been carried out and also an additional event occurs. This additional event could be, for example, the closing of the doors, this being signaled via the signal status of door switch 20. Control device 10 then forwards a corresponding display command to display unit 24. Operation of operating element 22 may also constitute an event that triggers display 26. For example, the user would have to operate the ignition switch or the ignition lock in order for display 26 to be triggered. However, first an authorization query (Step 103) would have to have been successfully carried out. The data stored in memory 12 may also be read in and out via diagnosis interface 28 and the accompanying input/output unit 30. This may also be used, for example, when the device is started up for the first time.

In addition to the use of the display in normal mode as described above, in special mode protected data can be queried and overwritten. This protected data may be located in control device 10, in transponder T1, T2, Tn, or in both components. As this data is access-protected, the special-mode operation of display 26 has to be initiated via a suitable operating sequence. To accomplish this, one option is for the ignition to be switched on and off a plurality of times. This special operating sequence causes control device 10 to carry out a first authorization query with a first transponder T1, as described above in connection with Step 103.

According to the exemplary embodiment and/or exemplary method of the present invention, at least one further authorization query with a further transponder T2, Tn must be successfully carried out in order for the special mode data to be displayed. Provided the authorization query has been carried out successfully with a further transponder T2, Tn, control device 10 prepares the special mode data to be displayed. The queries described above may be carried out or performed in a single step. For read mode, two transponders T1, T2 may be enough; for write mode, e.g., entering a new owner, all valid transponders T1, T2, Tn must be available for querying. The number of valid transponders T1, T2, Tn can be determined from the contents of the memory, and allows the write mode to be enabled once the number of transponders T1, T2, Tn has been determined and the subsequent comparison has been carried out.

Figure 2:
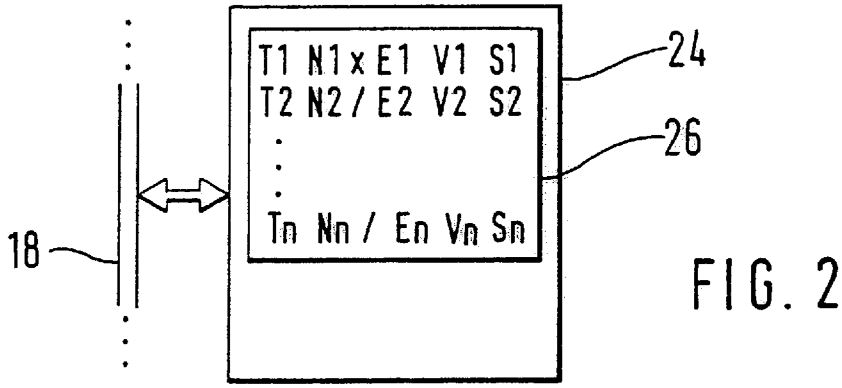
FIG. 2 shows a further display.

In addition to, or also independently of, the data already displayed in normal mode, in special mode confidential data V1, V2, Vn and/or special data S1, S2, Sn stored in transponders T1, T2, Tn may also be displayed (see FIG. 2). Control device 10 transmits a suitable command via transceiver 14 to the transponders T1, T2, Tn that are in range, so as to cause them to send back the special data S1, S2, Sn in question. Special data S1, S2, Sn and the data stored in memory 12 are forwarded to display unit 24 via bus system 18 with the help of an appropriate special display command.

Display 26 is now structured as shown in FIG. 2. Confidential data V1, V2, Vn and special data S1, S2, Sn may constitute information regarding the transponder owner, the address, service information regarding the vehicle, the vehicle's official ID, the vehicle registration certificate, the motor vehicle certificate, the chassis number, the engine number, or the insurance number. Thus, there is no need for an external read-out device. As described herein, it is easy for the workshop staff to access the data provided they are in possession of the necessary number of valid transponders T1, T2, Tn. If the vehicle's owner changes, data can be changed and the changes verified with the help of display 26 and input/output unit 30, provided all authorized transponders T1, T2, Tn are presented.

According to another exemplary embodiment, display 26 is also triggered if the authorization query carried out in Step 103 does not indicate a valid code or no code is received by transceiver 14 within a time period that begins when the search signal is sent out. Instead of immediate termination, Step 107 could also be used to trigger display unit 24 with a view to issuing a warning indicating "unauthorized transponder" or "no transponder." However, security-relevant information would not be displayed. In conjunction with a warning signal, display 26 may also be supported by visual or acoustic means (radio, or, for example, a piezoelectric signal generator).

Memory 12 may also be arranged in any other control device. In normal mode, data stored in transponders T1, T2, Tn may also be sent to display 26, the necessary transfer being carried out. Furthermore, transceiver 14 and control device 10 do not have to be structurally integrated. Instead, a plurality of transceivers 14 may be arranged at different points in the vehicle so as to ensure reliable detection of transponders T1, T2, Tn that are present. According to other exemplary embodiments, the signals from door switch 20 and/or operating element 22 are transmitted directly to control device 10. In addition to a visual display 26, the display unit 24 may be a display that merely indicates the transponders that are present via a back-lit display, or it may be an acoustic display. The door switches and tailgate switches may be connected directly to control device 10 to trigger the authorization query and/or display activation. The operating element 22 may be integrated into display unit 24. Furthermore, the authorization query described in connection with Steps 101 and 103 may be carried out in a single step and with one-time sending back of a transponder signal that is evaluated for authorization purposes.

What is claimed is:

1. A device for use as part of at least one of a keyless access system and a drive authorization system for reproducing information in a motor vehicle, the device comprising:

at least one portable transponder for transmitting a code via a transceiver to a control device arranged in the motor vehicle, at least one of access authorization and drive authorization being granted if the control device receives a valid code; and a display arranged in the vehicle for displaying specific data based on an output signal from the control device.

2. The device of claim 1, wherein the specific data is displayed if the valid code is received by the control device.

3. The device of claim 1, wherein the specific data is displayed if at least one of an operating element and a door contact have been operated.

4. The device of claim 1, further comprising a second transponder, wherein the specific data is displayed if another valid code is received by the control device from the second transponder.

5. The device of claim 1, wherein the transceiver sends out a search signal for causing each portable transponder of the at least one portable transponder that is within a range to send back a respective code, so that each portable transponder within the range is recognizable.

6. The device of claim 1, wherein the specific data depends on whether the valid code is received.

7. The device of claim 1, wherein the specific data stored in at least one of the at least one portable transponder and the control device is displayed.

8. The device of claim 1, wherein the display includes at least one of an acoustic display and a visual display.

9. The device of claim 1, wherein the specific data stored in at least one of the control device and the at least one portable transponder is only accessable via an interface and an input/output unit if the valid code has been received.

10. A method for reproducing information in a motor vehicle, having, as part of at least one of a keyless access system and a drive authorization system, a portable transponder for transmitting a code via a transceiver to a control device arranged in the motor vehicle, at least one of an access authorization and a drive authorization being granted if the control device receives a valid code, and having a display arranged in the vehicle, the display being for displaying specific data based on an output signal from the control device, the method comprising:

sending out a search signal from the transceiver for causing the transponder to send back the code;

evaluating the code received via the transceiver using the control device; and activating the display.

11. The method of claim 10, wherein the display is only activated if at least one received code is found valid.

12. The method of claim 10, wherein the display is activated if, after the search signal has been sent out, at least one of and an invalid code and no code is received within a specific time period.

* * * * *